United States Patent [19]
Behrendt et al.

[11] Patent Number: 5,865,922
[45] Date of Patent: Feb. 2, 1999

[54] PRODUCING FIBER REINFORCED COMPOSITES HAVING DENSE CERAMIC MATRICES

[75] Inventors: Donald R. Behrendt, Strongsville; Mrityunjay Singh, Parma, both of Ohio

[73] Assignee: The United States of America as represented by the Administrator of the National Aeronautics and Space Administration, Washington, D.C.

[21] Appl. No.: 725,205

[22] Filed: Sep. 20, 1996

Related U.S. Application Data

[63] Continuation of Ser. No. 265,902, Jun. 21, 1994, abandoned.
[51] Int. Cl.$^6$ .................................................. B32B 31/00
[52] U.S. Cl. ......................... 156/155; 156/89; 156/245; 427/228; 427/249; 427/375
[58] Field of Search ..................................... 428/110, 113, 428/114, 294, 408, 698, 288, 367, 375, 395, 333, 419.7, 431, 224, 902; 156/148, 155, 89, 245; 423/447.3, 450; 427/228, 249, 248.1, 367, 375, 394, 299, 333, 417.7, 432, 294, 380, 419.2, 443.2

[56] References Cited

U.S. PATENT DOCUMENTS

| | | | |
|---|---|---|---|
| 4,275,095 | 6/1981 | Warren | 427/228 |
| 4,970,123 | 11/1990 | Witzke et al. | 428/545 |
| 5,024,878 | 6/1991 | Robinbrosse et al. | 428/297 |
| 5,045,356 | 9/1991 | Uemura et al. | 427/249 |
| 5,061,414 | 10/1991 | Engle | 264/29.5 |
| 5,067,998 | 11/1991 | Singh et al. | 156/89 |
| 5,079,039 | 1/1992 | Heraud et al. | 427/249 |
| 5,132,155 | 7/1992 | Singh et al. | 428/114 |
| 5,198,152 | 3/1993 | Liimatta et al. | 252/389.31 |
| 5,221,578 | 6/1993 | Carpenter et al. | 428/367 |
| 5,350,545 | 9/1994 | Streckert et al. | 264/29.1 |

OTHER PUBLICATIONS

Patent Abstracts of Japan, vol. 17, No. 632, Nov. 24, 1993 & JP 05 195318 A (Toray Monofilament Co., Ltd.), Aug. 3, 1993.

*Primary Examiner*—Merrick Dixon
*Attorney, Agent, or Firm*—Kent N. Stone; Susan D. Reinecke

[57] ABSTRACT

A fiber preform is partially infiltrated with a ceramic material.

A porous solid polymer is formed by reaction forming the infiltrated preform which is then pyrolized. Microporous carbon in the composite matrix is converted into silicon carbide.

13 Claims, 1 Drawing Sheet

PRODUCING FIBER REINFORCED COMPOSITES HAVING DENSE CERAMIC MATRICES

This application is a continuation of application Ser. No. 08/265,902 filed on Jun. 12, 1994, now abandoned.

ORIGIN OF THE INVENTION

The invention described herein was made by an employee of the U.S. Government together with an associate of the National Research Council and is subject to the provisions of Section 305 of the National Aeronautics and Space Act 1958, Public Law 85-568 (72 Stat. 435, 42 U.S.C. § 1457).

1. Technical Field

This invention is concerned with the production of fiber reinforced composites. The invention is particularly directed to fiber reinforced composites having dense ceramic matrices.

Whisker reinforcement of matrices has been proposed in the prior art. However, problems have been encountered in the incorporation and the uniform distribution of whiskers in matrices. This leads to very high processing temperatures and pressures. In spite of these parameters, full densification is not easily achieved.

It is, therefore, an object of the present invention to produce dense silicon carbide and silicon carbide-refractory disilicide matrices for fiber reinforced composites.

Another object of the invention is to produce fiber reinforced composites utilizing both small and large diameter SiC fibers.

A still further object of the invention is to utilize whisker and particulate toughening mechanisms to improve ceramic matrices.

An additional object of the invention is to utilize whisker and particulate reinforcement to matrices to tailor the thermal expansion coefficient with the fibers.

2. Background Art

U.S. Pat. No. 4,970,123 to Witzke et al, U.S. Pat. No. 5,045,356 to Uemura et al and U.S. Pat. No. 5,024,878 to Robinbrosse et al are concerned with the densification of fiber reinforced ceramic. These patents show various means for chemical vapor infiltration and liquid infiltration.

U.S. Pat. No. 5,061,414 to Engle and U.S. Pat. No. 5,079,039 to Heraud et al are likewise concerned with the densification of fiber reinforced ceramics by chemical vapor infiltration. These patents additionally show multiple chemical vapor infiltration application steps.

DISCLOSURE OF THE INVENTION

The aforementioned objects are achieved by using silicon carbide refractory materials as a matrix for a fiber reinforced material. A fiber preform is placed within a chamber to undergo chemical vapor infiltration.

In the first step, chemical vapor infiltration is only partially carried out. This partial chemical vapor infiltration (CVI) treatment serves to rigidize the material as well as protect the fibers in subsequent processing.

In the next step, a partially densified CVI preform is impregnated with a resin mixture, then converted by high temperature pyrolization to produce a microporous carbon matrix which is connected to high temperature pyrolization. In the final step, the porous matrix is infiltrated with liquid silicon which forms silicon carbide with the pores of the matrix, resulting in a very dense fiber reinforced matrix.

BRIEF DESCRIPTION OF THE DRAWING

The advantage and novel features of the invention will be more fully apparent from the following detailed description when used in connection with the accompanying drawings in which.

BEST MODE FOR CARRYING OUT THE INVENTION

According to the present invention, a fiber preform of unidirectional fibers, 2-D woven fiber tows, or 3-D woven or braided fiber tows is positioned in a chamber that is suitable for chemical vapor infiltration (CVI). The preform is then partially densified by the CVI process with a suitable ceramic material to yield a rigid body having a relatively large volume fraction of interconnected pores. The material of infiltration may be SiC, $Si_3N_4$, or refractory disilicide.

Figure 1:
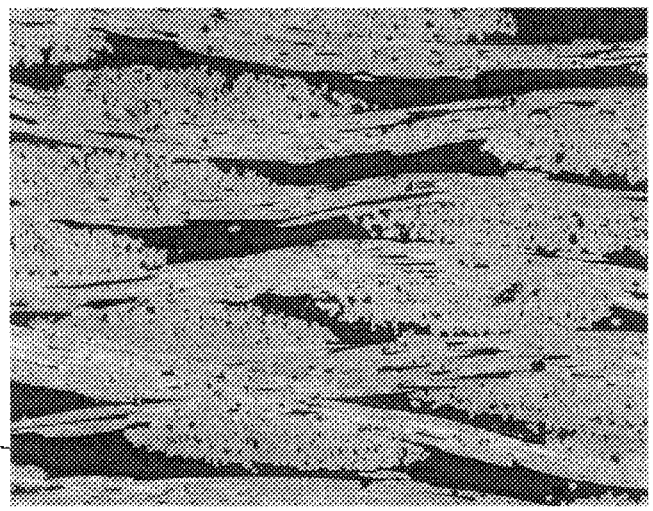
FIG. 1 is a photomicrograph at a 50 magnification showing the microstructure of a partially densified chemical vapor infiltrated preform.
Figure 2:
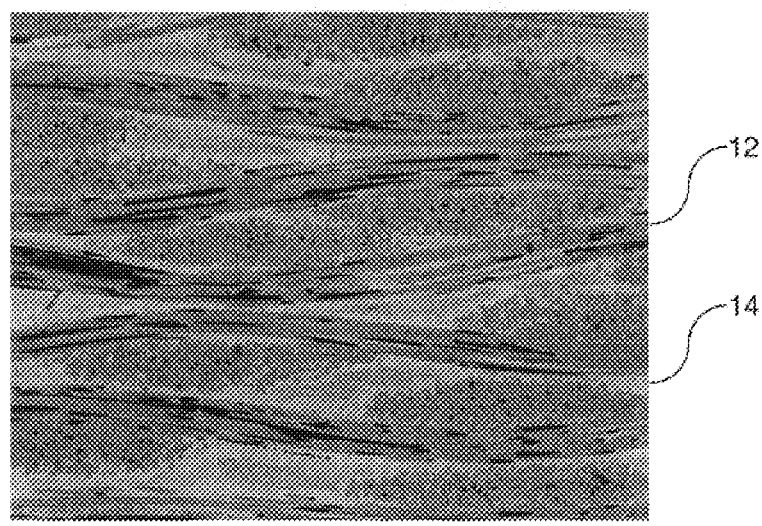
FIG. 2 is a photomicrograph at a 50 magnification showing the microstructure of a densified composite.

The CVI processing is done under conditions that will coat the fibers with a somewhat uniform coating of ceramic material. The purpose of this coating is twofold; the first being to render the body rigid for further processing, and the second to protect the fibers from damage by the further processing. The pore volume may be as small as 10 volume percent or as high as 60 volume percent. A typical microstructure of this preform is shown in FIG. 2 wherein dark areas 10 show porosity.

Subsequent processing steps involve the production of a near theoretically dense matrix. The partially chemical vapor infiltrated body is then processed by reaction forming in which the body is infiltrated with a resin mixture that is designed to produce the controlled microporous glassy carbon matrix. The resin mixture is a relatively high char yield resin, a pore forming agent, and an acid catalyst to promote polymerization of the resin.

When the resulting porous solid polymer is pyrolized to high temperature, the pore forming agent is removed by distillation and the solid polymer decomposes to a glassy carbon. The morphology of the glassy carbon has been varied from connected platelets, connected struts, to connected near spherical shapes. These morphology variations of the glassy carbon depend on the pore forming agent used, the time and temperature of polymerization, the type and amount of acid catalyst used, and other processing variables. The pore volume fraction of the matrix depends mainly on the amount of pore forming agent used in the resin mixture.

The last step in this process is to convert the microporous carbon of the composites matrix into silicon carbide. This accomplished by infiltrating the body with liquid silicon or a liquid silicon alloy.

The silicon readily infiltrates the porous body and reacts with the carbon to form silicon carbide. If an alloy of silicon is used, such as silicon-refractory metal alloys, the compound refractory disilicide is precipitated as the silicon reacts with the porous carbon. In either case, the final result is a dense matrix comprising silicon carbide and some free silicon and in the case of alloy infiltration, some additional precipitated disilicide. The amount of free silicon depends mainly on the volume fraction of pores in the pyrolized matrix. If the porous carbon matrix has a pore volume fraction of 0.562, the final siliconized matrix will have no free silicon. If it contains a larger amount of pores, there will be some free silicon in the final material.

A typical microstructure of this densified composite is shown in FIG. 2. Fibers 12 reinforce a SiC+si matrix 14.

Figure 3:
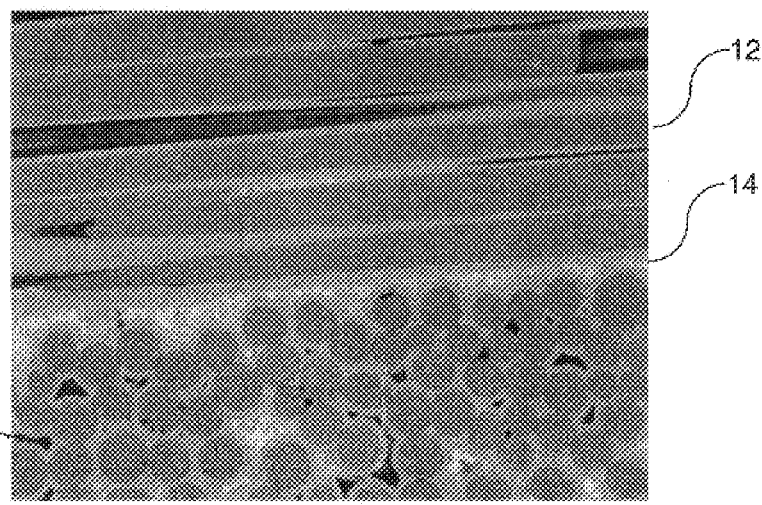
FIG. 3 is a photomicrograph at a 50 magnification showing a microstructure of a densified composite.

Another typical microstructure of a densified composite 14 is shown in FIG. 3. The fibers 12 reinforce the SiC+Si matrix 14. Canned porosity 16 appears between certain fibers.

The aforementioned process has many advantages over other processes described for the processing of ceramic matrix composites. By way of example, the processing time is shorter and the processing temperature is lower than other techniques. Very complex shapes can be made by forming the reinforcing fibers or tows of fibers into the desired shape by braiding or other similar process.

The use of tooling during the chemical vapor infiltration processing can further define the desired shape. The total processing is a near net shape method. The desired shape is determined in the CVI processing, and the subsequent reaction forming process produces only minor, if any, net shape changes.

The process of the present invention produces a near theoretical dense matrix formed mainly of silicon carbide with a small controllable amount of free silicon. This is likewise true for the silicon-refractory metal alloy infiltration with the addition of precipitated silicides in the matrix.

It will be apparent to one skilled in the art that the process of the present invention can be used not only to densify bodies made by the CVI process, but other bodies made by other ceramic processing methods that produce a porous ceramic or ceramic matrix composite. Ceramic bodies or composites made by reaction-bonded silicon nitride, made by ceramic polymer precursors, or made by other processes that produce a material that is porous may be densified by the reaction forming process of the present invention.

Numerous modifications and adaptations of the present invention will be apparent to those skilled in the art. Thus, it is intended by the following claims to cover all modifications and adaptations which fall within the true spirit and scope of the invention.

What is claimed:

1. A method of producing fiber reinforced composites having dense ceramic matrices comprising:

positioning a body of fibers in a chamber, partially infiltrating the body of fibers with a ceramic material resulting in a rigid body having a relatively large volume fraction of interconnected pores, reaction forming the infiltrated body of fibers thereby forming a porous solid polymer, pyrolizing said porous polymer to form a microporous carbon matrix, and converting the microporous carbon in the composites matrix into silicon carbide.

2. A method of producing fiber reinforced composites having dense ceramic matrices as claimed in claim 1 wherein the fibers are a preform of unidirectional fibers.

3. A method of producing fiber reinforced composites having dense ceramic matrices as claimed in claim 1 wherein the fibers are 2-D woven fiber tows.

4. A method of producing fiber reinforced composites as claimed in claim 1 wherein the fibers are 3-D woven fiber tows.

5. A method of producing fiber reinforced composites having dense ceramic matrices as claimed in claim 1 wherein the fibers are 3-D braided fiber tows.

6. A method of producing composites as claimed in claim 1 wherein the fibers are partially infiltrated by chemical vapor infiltration in said chamber.

7. A method of producing reinforced composites as claimed in claim 6 wherein the fibers are partially infiltrated with a ceramic material selected from the group consisting of SiC, $Si_3N_4$, and refractory disilicides.

8. A method of producing composites as claimed in claim 7 wherein the body has a pore volume between 10 volume percent and 60 volume percent.

9. A method of producing composites as claimed in claim 1 wherein the reaction forming comprises infiltrating the body of fibers with a resin mixture.

10. A method of producing a composite as claimed in claim 9 wherein the resin mixture comprises a resin wherein said resin has a char yield of at least 50 percent, pore forming agent, and an acid catalyst to promote polymerization of the resin.

11. A method of producing a composite as claimed in claim 1 wherein the body is infiltrated with silicon.

12. A process of producing a composite as claimed in claim 11 wherein the silicon is a liquid.

13. A method of producing a composite as claimed in claim 12 wherein the body is infiltrated with a liquid silicon alloy.

* * * * *